Feb. 3, 1959　　　　　W. J. KECK　　　　2,871,658
SUSTAINER EXHAUST GAS DEFLECTOR
Filed Dec. 23, 1957　　　　　　　　　2 Sheets-Sheet 1

WILLIAM J. KECK
INVENTOR

BY
ATTORNEYS

WILLIAM J. KECK
INVENTOR

United States Patent Office 2,871,658
Patented Feb. 3, 1959

2,871,658
SUSTAINER EXHAUST GAS DEFLECTOR

William J. Keck, Sacramento, Calif., assignor to the United States of America as represented by the Secretary of the Navy Application December 23, 1957, Serial No. 704,845
8 Claims. (Cl. 60—35.6)

This invention relates generally to safety devices for use with a pair of rockets arranged in tandem formation, and more particularly to an improved safety device for preventing the ignition of both rockets due to the accidental ignition of one of them.

It is customary to store tandem rockets in an assembled condition, but unarmed until ready for launching. With the forward and aft rockets assembled in the unarmed condition, accidental ignition of one of them has resulted in the ignition of the other.

The primary object of the invention, therefore, is to provide a safety device intermediate the forward and aft rockets which will prevent the hot gases from one accidentally ignited rocket from acting on and igniting the other.

Another object of the invention is to provide a safety device which will prevent the complete ignition of a pair of rockets arranged in tandem by venting the hot gases from the accidentally ignited rocket to the atmosphere.

A further object of the invention is to provide a safety device which will prevent the complete ignition of a pair of rockets in tandem by providing an insulating chamber between the rockets for receiving and discharging hot gases from one of the rockets in the event of accidental ignition thereof.

A still further object of the invention is to provide a safety device which will prevent the complete ignition of a pair of rockets in tandem by deflecting the hot gases from one accidentally ignited rocket so that they will not come in contact with and ignite the other rocket.

Other objects and many of the attendant advantages of the invention will be readily apparent as the same becomes understood by reference to the following detailed description when considered in connection with the accompanying drawings wherein:

Fig. 3 is a transverse section on the line 3—3 of Fig. 2.

Generally the invention consists of a device for a pair of rockets connected in tandem which will prevent hot gases from accidental ignition of one of the rockets from coming in contact with and igniting the other rocket. The device consists of an adapter for connecting the rockets in tandem and having a conical deflector mounted transversely therein. The deflector is positioned so that the hot gases from the accidentally ignited rocket will be deflected away from the other rocket thereby preventing the ignition thereof.

Figure 1:
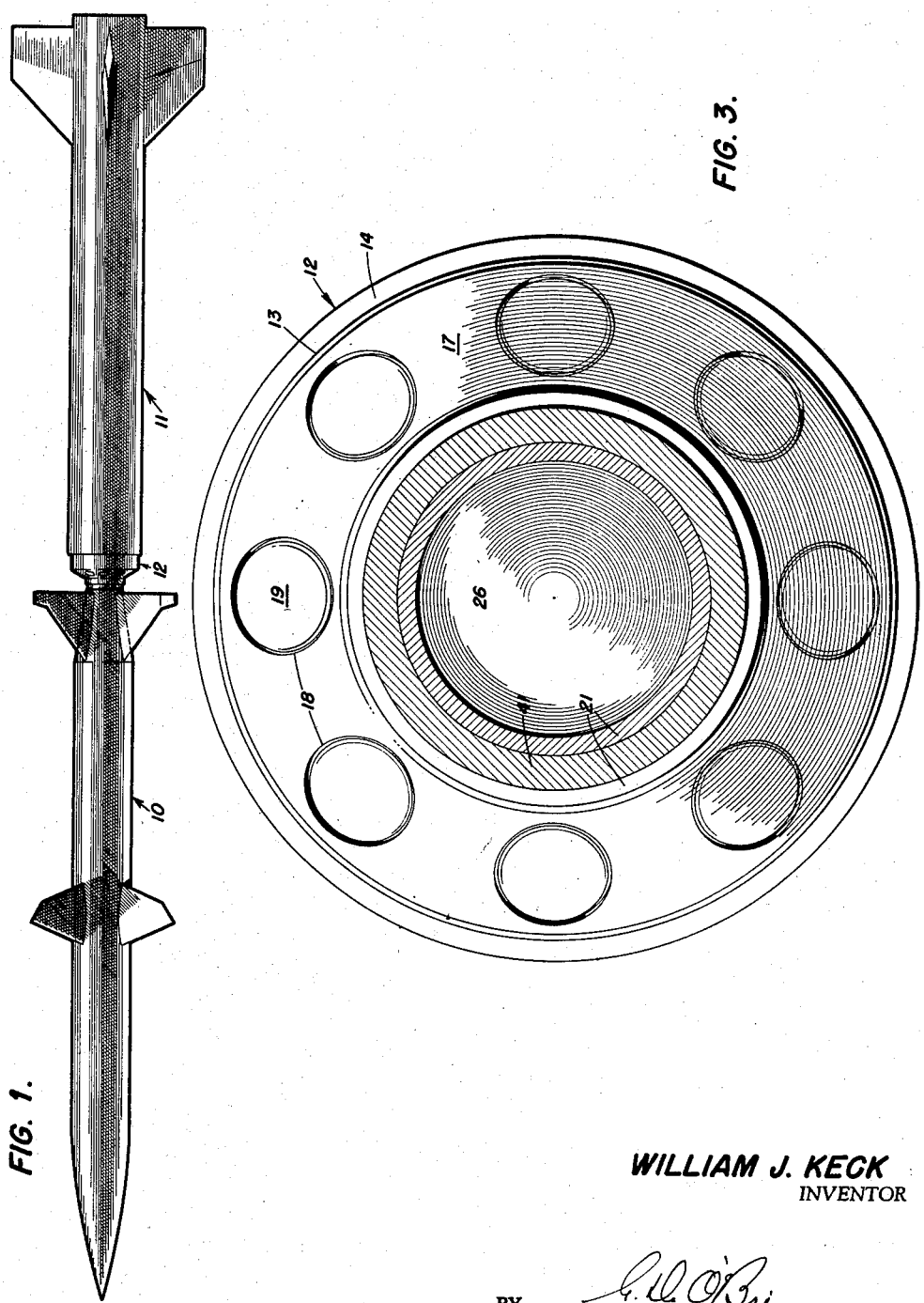
Fig. 1 is an elevation showing a tandem rocket arrangement embodying the present invention.
Figure 2:
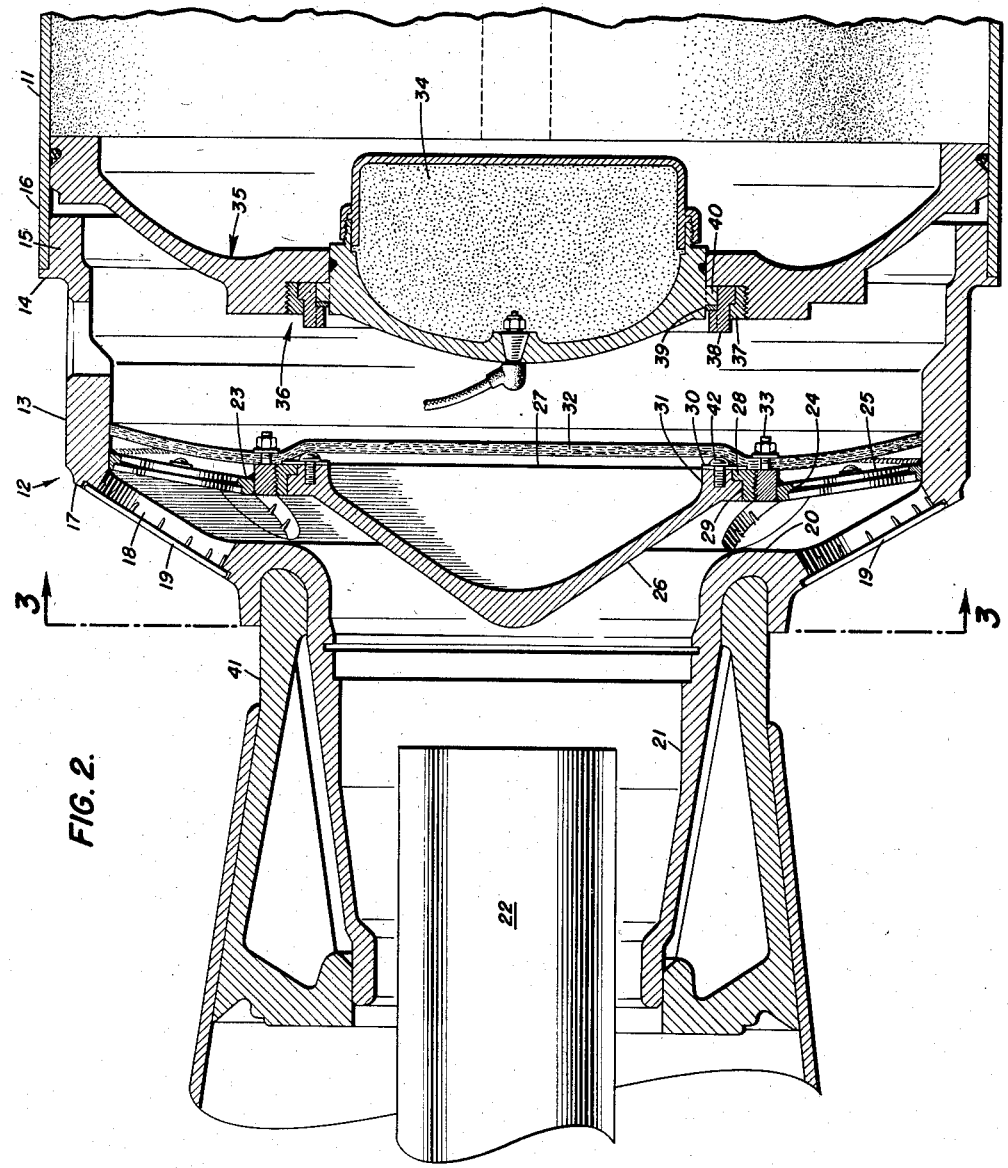
Fig. 2 is an enlarged detail sectional view of the deflecting device of the invention installed within a rocket adapter.

The tandem rocket arrangement illustrated in Fig. 1 comprises a forward rocket 10 and an aft rocket 11, which are of conventional construction and design, and an adapter 12. The adapter 12, Fig. 2, is of unitary cast construction and consists of an aft cylindrical section 13 having a flange 14 which is reduced in diameter throughout the greater portion of its length to define a rearwardly extending sleeve 15 which fits into the wall 16 at the forward end of the aft rocket 11. Forward of the cylindrical section 13 is a frusto-conical section 17 provided with a series of equally spaced vent holes 18 having blowout covers 19, and forward of the frusto-conical section 17 is an arcuate cylindrical shoulder 20 at the base of a second frusto-conical section 21 that extends into and is attached (by any conventional means) to the rear section 41 of the forward rocket 10 so that it encircles the rear end portion of the tailpipe 22 of said forward rocket.

Within the aft cylindrical section 13 of the adapter 12 there is mounted a web assembly 23 provided with a plurality of vent holes 24 having blowout covers 25, the holes 24 being in registry with the vent holes 18 in the section 17. A conical deflector 26, of cast metal, is axially positioned in a central opening 27 of the web assembly 23 with its apex disposed within the section 21. The deflector is positioned with its rim seated on a shoulder 28 of a coupling ring 29 screwed into the central opening 27 of the web assembly and is held in position by a plurality of flat, frangible metal clips 30 secured to the rim 31 of the deflector by screws 42. Aft of the adapter web assembly 23 there is located an asbestos radiation shield 32 which extends transversely of and is secured to the web assembly by bolts 33. The bolt holes in the shield for the bolts 33 weaken the shield at points adjacent the rim of the deflector so that the center section of the shield will be displaced forwardly with the deflector 26, upon accidental ignition of the aft rocket 11 as will be described in more detail hereinafter.

The aft rocket igniter 34 is centrally positioned in the aft rocket head assembly 35 by a two position locking device 36 consisting of a locking ring 37, a slidably mounted interrupted shoulder ring 38, a shear washer 39 and projections 40, the latter on the aft rocket igniter. The igniter 34 is mounted in the aft rocket head assembly 35 and maintained in an unlocked position until ready for launching. When it is in the unlocked position it is held in place by the shear washer 39. To lock the aft rocket igniter in a position ready for launching, the shoulder ring 38 is rotated by gear means (not shown) so that each projection 40 is in alignment with a corresponding shoulder on said shoulder ring.

In use, if the forward rocket 10 is accidentally ignited hot gases will be discharged from the tailpipe 22 against the deflector 26. The deflector, web assembly 23, and covers 25 seal off the aft interior portion of the adapter thus creating a pressure build-up within the adapter which will displace the blowout covers 19, thereby venting the hot gases to the atmosphere. The radiation shield 32 will prevent heat radiated by the deflector 26 from igniting the aft rocket igniter 34.

If the aft rocket 11 is accidentally ignited, the aft rocket igniter 34 will be forced out of the aft rocket head assembly 35 thus shearing the shear washer 39. The impact of the igniter 34 against the radiation shield 32 will break the shield about the circular path formed by the bolts 33. The center section of the shield and the igniter will then strike the deflector 26 shearing clips 29 allowing the deflector to move forwardly until it comes in contact with the adapter shoulder 20. The forward interior portion of the adapter will be sealed off thus providing an isolation chamber for the forward rocket 10. The pressure of the hot gases will hold the igniter 34 against the deflector 26 until the aft rocket has been completely burned. The rapid increase of pressure below the adapter web assembly 23 will disintegrate the remaining portion of the radiation shield and blow it and the covers 25 and 19 out through vent holes 18.

Obviously many modifications and variations of the

What is claimed is:

1. A safety device for preventing the complete ignition of a pair of rockets in tandem formation due to the accidental ignition of either of said rockets, comprising means for connecting a pair of rockets in fore and aft tandem formation and having a plurality of vent holes therein, means within said first means and positioned for deflecting gases from the fore rocket of said pair to said vent holes and being movable by gas pressure from said aft rocket to a second position for deflecting gases from said aft rocket to said vent holes.

2. A safety device for preventing the complete ignition of a pair of rockets in fore and aft tandem formation due to the accidental ignition of either of said rockets, comprising an adapter secured to the forward end of the aft tandem rocket, said adapter including a forwardly extending portion secured to the aft end of the fore rocket and encompassing the tailpipe of said fore rocket, said adapter having a hollow interior for the collection of gases and a plurality of vent holes to permit the escape of said collected gases, and means within said adapter positioned for deflecting gases from said fore rocket to said vent holes and shiftable by gas pressure from said aft rocket to a second position for deflecting gases from said aft rocket to said vent holes.

3. A safety device for preventing the complete ignition of a pair of rockets in fore and aft tandem formation due to the accidental ignition of either of said rockets, comprising means for connecting the pair of rockets in said tandem formation and having a plurality of vent holes therein, a conical deflector within said means and having an aft position for deflecting gases from the fore rocket of said pair to said vent holes, said deflector being displaceable by gas pressure from said aft rocket to a position for deflecting gases from the aft rocket of said pair to said vent holes.

4. A safety device for preventing the complete ignition of a pair of rockets in fore and aft tandem formation due to the accidental ignition of either of said rockets, comprising an adapter secured to the forward end of the aft rocket, said adapter including a forwardly extending portion secured to the aft end of the fore rocket and encompassing the tailpipe of said fore rocket, said adapter having a hollow interior for the collection of gases and a plurality of vent holes formed substantially medially thereof in an annularly spaced series to permit the escape of said collected gases, and a conical deflector within said adapter and positioned to deflect collected gases from the fore rocket to said vent holes, said deflector being displaceable forwardly by gas pressure from said aft rocket to a position to deflect collected gases from the aft rocket to said vent holes, said deflector then sealing off the forward interior portion of said adapter to provide an isolating chamber for said fore rocket.

5. The combination claimed in claim 4, including a radiation shield positioned aft of said deflector and having a central circular section which is displaceable with said deflector to said forward position.

6. The combination with a pair of rockets, comprising means for connecting said rockets in tandem in a fore and aft relationship, said means including means for deflecting hot gases produced by the accidental ignition of the fore rocket to the atmosphere and being shiftable by gas pressure from said aft rocket to a forward position to deflect hot gases from the accidental ignition of the aft rocket to the atmosphere.

7. The combination claimed in claim 6, in which said first-mentioned means comprises an adapter having a hollow interior and a plurality of vent holes to permit the escape of said deflected gases, and blowout covers for said vent holes.

8. The combination claimed in claim 7, wherein said adapter includes an interior web assembly having a plurality of vent holes aligned with said adapter vent holes and having blowout covers therein which are arranged to be displaced through said adapter vent holes by gases from said aft rocket.

References Cited in the file of this patent

UNITED STATES PATENTS

| | | |
|---|---|---|
| 2,654,320 | Schmid | Oct. 6, 1953 |
| 2,724,237 | Hickman | Nov. 22, 1955 |
| 2,775,201 | Conway | Dec. 25, 1956 |